(Model.)
R. A. GOODENOUGH.
HORSESHOE.
No. 252,210. Patented Jan. 10, 1882.
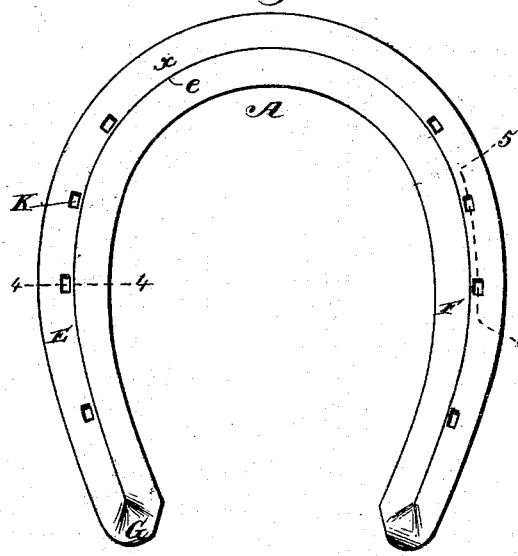
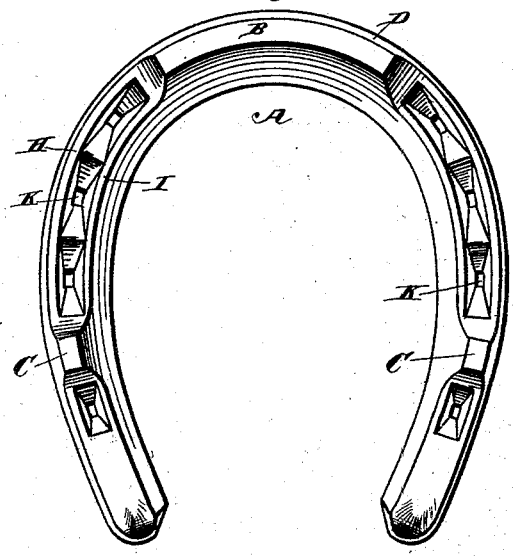
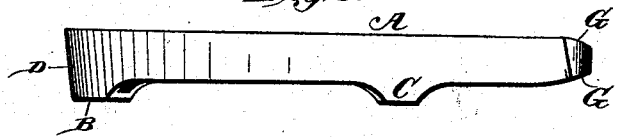
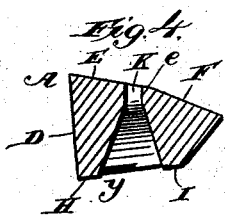
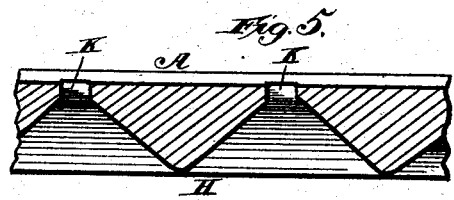
Witnesses.
Robert Everett
Vinton Coombs
Inventor:
Rollin A. Goodenough
By James L. Norris.
Atty.

UNITED STATES PATENT OFFICE.

ROLLIN A. GOODENOUGH, OF NEW YORK, N. Y., ASSIGNOR OF ONE-HALF TO CHARLES W. RUSSELL, OF SAME PLACE.

HORSESHOE.

SPECIFICATION forming part of Letters Patent No. 252,210, dated January 10, 1882.

Application filed September 24, 1881. (Model.)

*To all whom it may concern:*

Be it known that I, ROLLIN A. GOODENOUGH, a citizen of the United States, residing at New York, in the county and State of New York, have invented new and useful Improvements in Horseshoes, of which the following is a specification.

The object of my invention is to construct a shoe that will be securely held upon the hoof and not be liable to be thrown or forced off. Various devices have been resorted to to accomplish this purpose, the usual and most common being to form a clip or lip upon the toe of the shoe, which sits up in or against the front of the hoof and holds the shoe in place. My improvement, however, consists in forming the face of the shoe next the hoof with two inclined faces or bevels, each inclining upward from its inner to its outer margin and having a distinct and different degree of inclination from the other, the outer bevel corresponding in breadth to the thickness of the shell or crust of the hoof and forming a bearing for the same inclined to a horizontal plane, while the inner bevel is slightly more inclined, so as to clear the sole. Under this construction the hoof of the horse will rest solely upon the outer bevel or incline, both the shoe and the hoof being level and the impact complete, and the weight of the animal will be thrown entirely upon the wall of the foot, outside of the points where the nails enter the hoof, thus forming a union between the hoof and the shoe which it will be impossible to disturb except by the most violent means.

A further object of my invention is to prevent injury to the heel of the hoof by chamfering the heels of the shoe on both sides, all as hereinafter more fully described.

In the accompanying drawings, Figure 1 is a plan view of the hoof-face of the shoe. Fig. 2 is a plan view of the ground side of the shoe; Fig. 3, a side view; Fig. 4, a transverse section of one side of the shoe, between the end calk and toe-calk, on the line 4 4 of Fig. 1; and Fig. 5 is a section through the line 5 5 of Fig. 1.

The shoe A is formed with the toe-calk B and the rear calks, C C. The latter, it will be observed, are not at the ends of the shoe, but are somewhat removed, so as to bring them just under the strongest and hardiest portion of the hoof. By this construction the shoe is made more comfortable, lameness is prevented, and at the same time the shoe is perfectly strong and durable.

The shoe is inclined, as shown at D, Fig. 4, from the upper side or hoof-face, *x*, inwardly to the ground face, *y*, to prevent interfering, as above set forth.

In order to give the shoe a firm seat and hold it securely on the hoof, I form the hoof-face with the two distinct outwardly-inclined bevels or inclines E F, the outer one, E, extending from the outer edge of the hoof inward for about half the width of the shoe, where the inner and more steeply-inclined one meets it. The width of the outer incline, E, is made to correspond as nearly as practicable with the thickness of the wall or outer shell of the hoof, and constitutes the only seat or bearing for the same, whereby the weight and concussion are brought to bear upon the stronger wall portion of the hoof outside of where the nails enter the crust, while the sharper and more acute bevel F inclines away from and clears the sole or tender portion of the foot, and it is relieved from the impact of the shoe. The ridge *e* forms a guide-line for punching the nail-holes from that side of the shoe to meet and complete the usual holes, K.

From the foregoing description and an inspection of the drawings it will be observed that the highest point of the outer incline or bevel, E, is at the outer edge of the shoe and its lowest point is at its junction with the inner bevel, F, near or at the center of the width of the shoe; also, that the highest point of the inner incline or bevel is where it joins the lower portion of the outer incline or bevel and its lowest point at the inner edge of the shoe.

The heels of the shoe are chamfered off on both the upper and lower face, as shown at G G, Fig. 3, and this prevents the concussion of the hoof upon the ground being transmitted to the heel or quarter of the hoof, and prevents the tender part from bruising and soreness.

The outer wing or ridge, H, is higher than the inner one, I. This strengthens the shoe without materially increasing the weight, prevents breakage in bending, and affords greater protection from wear to the nail-heads.

From the above it will be seen that my improved shoe materially decreases the diseases of the hoof and leg to which horses are so liable, and that it therefore possesses many advantages over those heretofore used.

The shoe illustrated in the drawings is of the general character shown in my reissued Letters Patent, No. 6,072, of September 29, 1874, and I design using the improvements above described on shoes of that character; but, of course, they are equally applicable to any of the ordinary kinds of shoes in general.

From the above it will be seen that the hoof has its bearing upon an incline outside of the points where the nails enter the crust, and that to form a perfect fit or impact it will only be required that the shoe and the hoof be perfectly level.

With the improvements herein described my shoes will be found to be always entirely ready for use. They can be applied either in camp or field or on the road without the use of fire or forge or the aid of a smith, which, so far as I am aware, cannot be done with any other known horseshoe.

Any handy man who can drive a nail safely into a horse's hoof can put these shoes on, using a wagon-tire as an anvil to open out the heels if the shoe is too narrow, or to close the same if they are too wide apart; also, a shoe cast by the animal can be thus replaced without further driving over the road.

These shoes will be found of the utmost importance to troops on the march and to transportation companies, and, from their adaptation to be fitted and applied cold, all of the troubles and diseases caused by the ordinary hot fitting and foot-burning will be absolutely avoided.

It will also be evident that as the shell of the hoof will bear upon the beveled face having an inward inclination the shoe cannot be knocked off by any of the ordinary concussions which so frequently knock off the shoes heretofore made and used.

What I claim, and desire to secure by Letters Patent, is—

1. A horseshoe having its hoof-face constructed with two distinct bevels, E and F, both inclined upwardly, essentially as shown and described, the outer bevel, E, extending in a downward direction from the outer edge of the hoof-face for about half the width of the shoe to form a seat corresponding in breadth to the shell or crust of the animal's hoof, and the inner bevel, F, being formed at a greater inclination than the outer one, and extending in a downward direction toward the inner edge of the shoe to clear the sole of the hoof, substantially as and for the purpose set forth.

2. A horseshoe having its heels chamfered upon both their top and bottom faces, as shown, to prevent the concussion of the hoof upon the ground being transmitted to the heel or quarter of the hoof, and thereby preventing the tender part being bruised or becoming sore.

In testimony whereof I have hereunto set my hand and seal in the presence of two subscribing witnesses.

R. A. GOODENOUGH. [L. S.]

Witnesses:
L. NEWGASS,
CHAS. W. RUSSELL.